US008573113B2

(12) United States Patent
Oleniacz et al.

(10) Patent No.: US 8,573,113 B2
(45) Date of Patent: Nov. 5, 2013

(54) PISTON AND CYLINDER ASSEMBLY

(75) Inventors: Chester Oleniacz, Parma, OH (US); David D. Colavincenzo, Castalia, OH (US); Jeffrey Michael Geither, North Ridgeville, OH (US); Nicholas Petek, North Royalton, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 859 days.

(21) Appl. No.: 12/771,630

(22) Filed: Apr. 30, 2010

(65) Prior Publication Data

US 2011/0265643 A1 Nov. 3, 2011

(51) Int. Cl.
*F16J 9/28* (2006.01)

(52) U.S. Cl.
USPC .......... 92/242

(58) Field of Classification Search
USPC .......... 92/240, 242, 248, 249, 253
See application file for complete search history.

(56) References Cited

U.S. PATENT DOCUMENTS

| | | | |
|---|---|---|---|
| 1,214,696 A * | 2/1917 | Luitwieler | 92/242 |
| 2,419,192 A | 4/1947 | Anderson | |
| 2,893,799 A | 7/1959 | Marien | |
| 3,115,934 A | 12/1963 | Rector | |
| 3,389,973 A | 6/1968 | Fitzpatrick | |
| 3,462,333 A | 8/1969 | McCormick et al. | |
| 3,503,823 A | 3/1970 | Richart et al. | |
| 3,554,563 A | 1/1971 | Schumacher et al. | |
| 3,656,414 A | 4/1972 | Muller | |
| 3,658,350 A | 4/1972 | Ondraka | |
| 3,751,047 A | 8/1973 | McGee | |
| 3,765,560 A | 10/1973 | Kemp | |
| 3,855,073 A | 12/1974 | Kucharzyk | |
| 4,005,763 A | 2/1977 | Wallis | |
| 4,052,112 A | 10/1977 | Faber | |
| 4,132,420 A | 1/1979 | Lundholm | |
| 4,206,930 A | 6/1980 | Thrane et al. | |
| 4,244,192 A | 1/1981 | Chellis | |
| 4,552,233 A | 11/1985 | Klima | |
| 4,576,381 A | 3/1986 | Slack | |

(Continued)

FOREIGN PATENT DOCUMENTS

| | | | |
|---|---|---|---|
| DE | 2041495 | C3 | 3/1977 |
| DE | 2608441 | B2 | 4/1980 |

(Continued)

OTHER PUBLICATIONS

Bendix Flyer, Installation Instructions, S-1523, dated Jan. 2010.

(Continued)

*Primary Examiner* — Michael Leslie
(74) *Attorney, Agent, or Firm* — Calfee, Halter & Griswold LLP

(57) ABSTRACT

A piston and cylinder assembly includes a housing defining a bore. A piston is sized to reciprocate in the bore. A first sealing member provides a sealing engagement between the piston and a wall of the bore. A first bushing, of a first material, is around a first portion of the piston toward a first end of the piston. A second bushing, of a second material, is around a second portion of the piston toward a second end of the piston. The first and second bushings guide the piston within the bore. The first material is different than the second material.

20 Claims, 2 Drawing Sheets

(56) References Cited

U.S. PATENT DOCUMENTS

| | | | |
|---|---|---|---|
| 4,629,200 | A | 12/1986 | Ruddy |
| 4,714,483 | A | 12/1987 | Koening et al. |
| 4,764,189 | A | 8/1988 | Yanagawa et al. |
| 4,955,994 | A | 9/1990 | Knight et al. |
| 5,003,940 | A | 4/1991 | Hixson |
| 5,080,133 | A | 1/1992 | Johnson et al. |
| 5,198,053 | A | 3/1993 | Duncan |
| 5,252,034 | A | 10/1993 | Sweet |
| 5,334,230 | A | 8/1994 | Sloka |
| 5,348,040 | A | 9/1994 | Shellhause |
| 5,427,609 | A | 6/1995 | Zoglman et al. |
| 5,465,811 | A | 11/1995 | Katz |
| 5,509,670 | A | 4/1996 | Wheeler |
| 5,743,707 | A | 4/1998 | Battig et al. |
| 5,749,391 | A | 5/1998 | Loutzenhiser |
| 6,113,367 | A | 9/2000 | Dunaevsky et al. |
| 6,205,908 | B1 | 3/2001 | Kumai et al. |
| 6,319,296 | B1 | 11/2001 | Fornof |
| 6,361,830 | B1 | 3/2002 | Schenk et al. |
| 6,428,014 | B2 | 8/2002 | Scarlett |
| 6,485,027 | B1 | 11/2002 | Carrie et al. |
| 6,502,826 | B1 | 1/2003 | Schroeder et al. |
| 6,668,703 | B2 | 12/2003 | Gamble |
| 6,726,220 | B2 | 4/2004 | Grimanis et al. |
| 6,729,696 | B2 | 5/2004 | Kemer et al. |
| 7,140,291 | B2 | 11/2006 | Dunaevsky et al. |
| 2004/0119242 | A1 | 6/2004 | Katumaru et al. |
| 2007/0028777 | A1 | 2/2007 | Hoffman et al. |

FOREIGN PATENT DOCUMENTS

| | | | |
|---|---|---|---|
| DE | 8510866 | U1 | 7/1985 |
| DE | 281274 | A5 | 8/1990 |
| DE | 9400669 | U1 | 5/1994 |
| DE | 29621818 | U1 | 3/1997 |

OTHER PUBLICATIONS

Bendix Service Data SD-08-2414, Bendix AD-IP, Integral Purge Air Dryer, BW1811, dated May 2007.

Bendix Flyer, Installation Instructions, S-1476, dated Mar. 2006.

Bendix Flyer, Installation Instructions, S-1386, dated Mar. 2005.

System Seals, Sealing System Products, Rod Seals and Wipers, Guide Elements & Static Seals, printed from website http://SystemSeals.com/products.htm#wipers on Apr. 30, 2010, dated 2005.

Article "Sealing and guiding elements for compressors Oil-free—The environment challenge to industry" from website www.elringklinger-kunstsoff.de, dated Feb. 2003.

Article Elring PTFE Properties and applications of an exceptional material from website www.elringklinger-kunstsoff.de, dated on or before Jan. 28, 2005.

Article Elring Spring Energised Seals Compact—univeral- predictable from website www.elringklinger-kunstsoff.de, dated Feb. 2003.

Article Compound Know-how Lead to Innovative Solutions from website www.elringklinger-kunstsoff.de, dated Jun. 2001.

Article "Piston and Rod Seals Spring-energized Seal Details" from website www.elringklinger-kunstsoff.de, dated on or before Jan. 28, 2005.

Article "Spring-energized Seal Types" from website www.elringklinger-kunstsoff.de, dated on or before Jan. 28, 2005.

* cited by examiner

PISTON AND CYLINDER ASSEMBLY

BACKGROUND

The present invention relates to a piston and cylinder assembly. It finds particular application in conjunction with a piston assembly used as a compressor unloader piston and will be described with particular reference thereto. It will be appreciated, however, that the invention is also amenable to other applications.

A compressor unloader piston assembly includes sealing members (e.g., o-rings, quad rings, and/or cap seals) that provide a seal against the cylinder bore wall and may also guide the piston within a cylinder bore. Side forces exerted on the sealing members have caused excessive wear on the sealing members and, in addition, piston bore damage. The excessive wear requires replacement of the sealing members earlier than desired. In addition, the damage to the piston bore tends to accelerate wear on the sealing members.

Separate guide features have been used to shield the unloader piston o-rings from side forces. However, separate guides increase manufacturing costs and complexity.

The present invention provides a new and improved apparatus for a compressor unloader piston assembly which addresses the above-referenced problems.

SUMMARY

In one embodiment, a piston and cylinder assembly includes a housing defining a bore. A piston is sized to reciprocate in the bore. A first sealing member provides a sealing engagement between the piston and a wall of the bore. A first bushing, of a first material, is around a first portion of the piston toward a first end of the piston. A second bushing, of a second material, is around a second portion of the piston toward a second end of the piston. The first and second bushings guide the piston within the bore. The first material is different than the second material.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
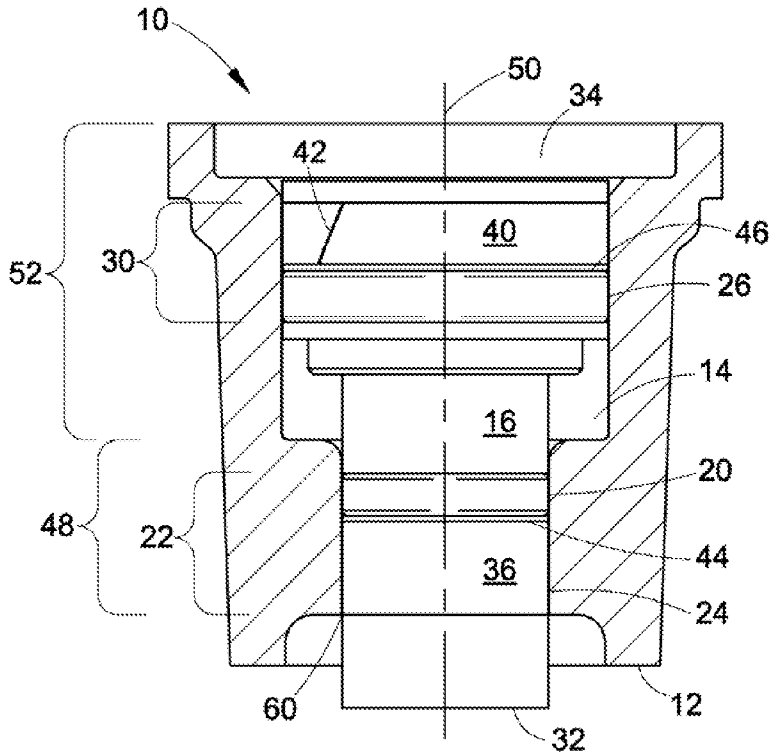
FIG. 1 illustrates a cross-sectional view of an exemplary piston and cylinder assembly, in an up position (unloaded), in accordance with one embodiment of an apparatus illustrating principles of the present invention.
Figure 2:
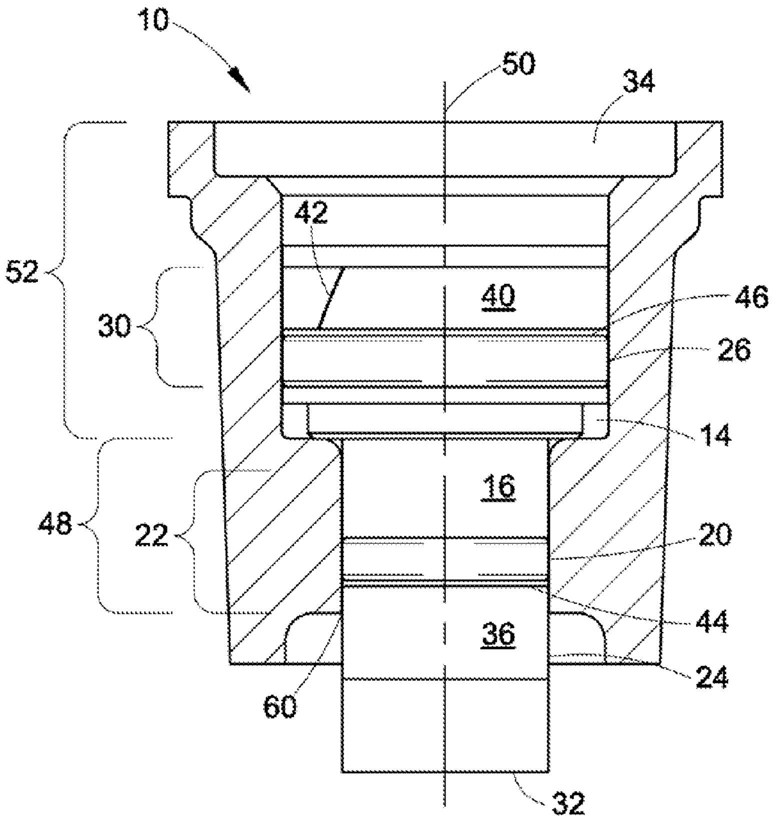
FIG. 2 illustrates a cross-sectional view of the exemplary piston and cylinder assembly, in a down position (loaded), in accordance with one embodiment of an apparatus illustrating principles of the present invention.

With reference to FIGS. 1 and 2, respective cross-sectional views of an exemplary piston and cylinder assembly 10 are illustrated in accordance with one embodiment of the present invention. The piston assembly 10 includes a housing 12, defining a bore 14, and a piston 16 sized to reciprocate in the bore 14 (e.g., alternately move in opposite directions within the bore 14). In FIG. 1, the piston 16 is illustrated in an "up" position (unloaded) in the piston assembly 10; and in FIG. 2, the piston 16 is illustrated in a "down" position (loaded) in the piston assembly 10.

A first seal 20 (e.g., a lower sealing member) sealingly engages a first portion 22 (e.g., a lower portion) of the piston 16 and an inner wall 24 of the bore 14. Therefore, the lower seal 20 provides sealing engagement between the lower portion 22 of the piston 16 and the inner wall 24 of the bore 14. A second seal 26 (e.g., an upper sealing member) sealingly engages a second portion 30 (e.g., an upper portion) of the piston 16 and the inner wall 24 of the bore 14. Therefore, the upper sealing member 26 provides sealing engagement between the upper portion 30 of the piston 16 and the inner wall 24 of the bore 14. It is contemplated that the lower and upper sealing members 20, 26 are standard o-rings.

The lower portion 22 of the piston 16 is toward a first end 32 (e.g., a lower end) of the piston 16. The upper portion 30 of the piston 16 is toward a second end 34 (e.g., an upper end) of the piston 16.

A first bushing 36 (e.g., a lower bushing) is around the lower portion 22 of the piston 16. A second bushing 40 (e.g., an upper bushing) is around the upper portion 30 of the piston 16. In one embodiment, one or both of the lower and upper bushings 36, 40, respectively, are split (see, for example, the illustrated slanted cut 42 in the upper bushing 40) to facilitate flex installation around the lower and upper portions 22, 30, respectively, of the piston 16. As discussed in more detail below, the first and second bushings 36, 40, respectively, are different materials.

The lower and upper bushings 36, 40, respectively, are captured (retained) in respective grooves 44, 46 formed in the lower and upper portions 22, 30 of the piston 16. In the illustrated embodiment, the lower sealing member 20 is proximate the lower bushing 36, and the upper sealing member 26 is proximate the upper bushing 40.

As evident in the embodiment illustrated in FIGS. 1 and 2, the piston 16 has different diameters at various vertical positions. Similarly, the bore 14 also has different diameters at various vertical positions. For example, both a lower portion 48 of the bore 14 and the lower portion 22 of the piston 16 have a relatively smaller diameter than both an upper portion 52 of the bore and the upper portion 30 of the piston 16. The various diameters of the piston 16 and the lower and upper bushings 36, 40, respectively, are sized such that the lower and upper bushings 36, 40, respectively, provide the largest diameters at the lower and upper portions 22, 30, respectively, of the piston 16. The wall 24 of the bore 14 and the lower and upper sealing members 20, 26, respectively, are sized according to, for example, industry standard sealing member design (i.e., so that the lower and upper sealing members 20, 26 provide a seal between the wall 24 of the bore 14 and the lower and upper portions 22, 30, respectively, of the piston 16). An outer diameter of the lower sealing member 20 is sized to be greater than or equal to respective outer diameters of both the lower portion 22 of the piston 16 and the lower bushing 36. Similarly, an outer diameter of the upper sealing member 26 is sized to be greater than or equal to respective outer diameters of both the upper portion 30 of the piston 16 and the upper bushing 40.

Since the lower and upper bushings 36, 40, respectively, provide the largest diameters at the lower and upper portions 22, 30, respectively, of the piston 16, the bushings 36, 40 act to guide the piston 16 in the bore 14. For example, the bushings 36, 40 act to maintain a vertical axis 50 of the piston 16 substantially parallel to the wall 24 of the bore 14 to maintain compression on the lower and upper sealing members 20, 26, respectively, while allowing the piston 16 to slide within the bore 14. In one embodiment, the piston 16 does not contact the bore 14.

By guiding the piston in the bore 14, side loads on the sealing members 20, 26 are reduced as the piston 16 reciprocates in the bore 14. For example, any side loads generated during reciprocation of the piston 16 in the bore 14 are resisted by the bushings 36, 40. Reduced side loads on the sealing members 20, 26 reduce excessive pressure between the sealing members 20, 26 and the wall 24 of the bore 14, which facilitates in extending the life of the sealing members 20, 26. In addition, reduced side loads during reciprocation of the piston 16 in the bore 14 help reduce abrasions on both the sealing members 20, 26 and the wall 24 of the bore 14. The bushings 36, 40 guide the piston 16 to protect the sealing members 20, 26 from side loads without requiring separate guide features.

In this manner, the bushings 36, 40 are a means for reducing side loads on the lower and upper sealing members 20, 26 during reciprocation of the piston 16 in the bore 14.

Figure 3:
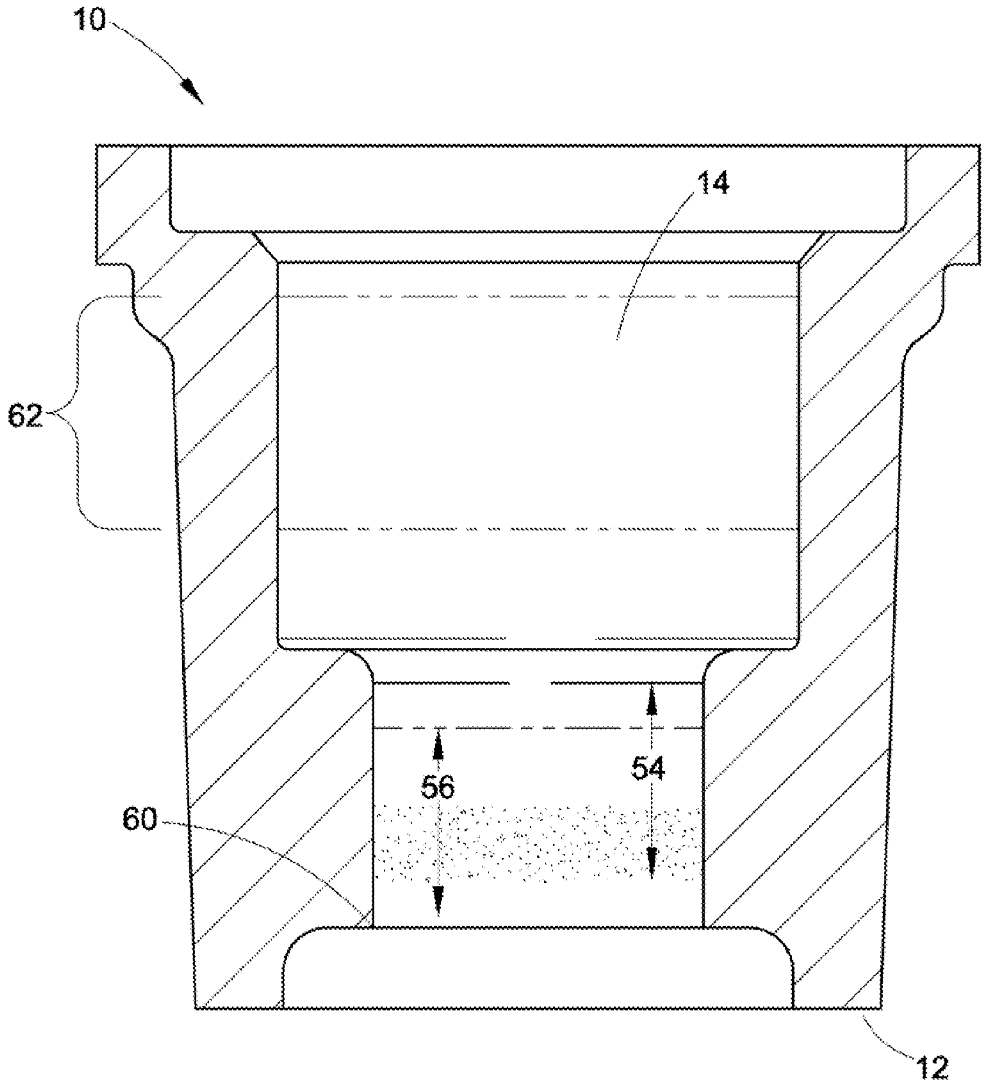
FIG. 3 illustrates a cross-sectional view of a housing of the piston and cylinder assembly.

With reference to FIG. 3, as the piston 16 reciprocates in the bore 14, the lower sealing member 20 sealingly rides along a first portion 54 of the wall 24 of the lower portion 48 of the bore 14. At the same time, a top of the lower bushing 36 rides along a second portion 56 of the wall 24 of the lower portion 48 of the bore 14. In the illustrated embodiment, the first and second portions 54, 56, respectively, at least partially overlap.

In the illustrated embodiment, a first edge 60 is defined along the wall 24 of the bore 14. The first, lower bushing 36 reciprocates at the edge 60. In one embodiment, a majority of the first, lower bushing 36 passes by the edge 60 (and extends outside the bore 14) as the piston 16 reciprocates.

With reference again to FIGS. 1 and 2, as discussed above, the lower and upper bushings 36, 40, respectively, are different materials. It is contemplated that the material of the lower bushing 36 is relatively harder than the material of the upper bushing 40. It is contemplated that both of the materials have good chemical resistance with a maximum service temperature of about 500° F. for resisting heat damage, a relatively low coefficient of friction, relatively good sliding properties, and high wear-resistance.

In one embodiment, the material of the lower bushing 36 has a hardness of about 85±5 Shore D, an elongation of about 25%, a tensile strength of about 13778 psi (95 MPa), and a coefficient of friction of about 0.30 to about 0.38. The material of the upper bushing 40 is an internally lubricated plastic having a hardness of about 60±5 Shore D, an elongation of about 260%, tensile strength of about 2900 psi (20 MPa), and a coefficient of friction of about 0.18. The internal lubrication of the upper bushing 40 and relatively softer material of the upper bushing 40 help avoid abrasion on the wall 24 of the bore 14.

In one embodiment, the material of the lower bushing 36 is Polyetheretherketon (PEEK), and the material of the upper bushing 40 is Polytetrafluoroethylene (PTFE). Optionally, the material of the lower bushing 36 and/or the material of the upper bushing 40 also includes fillers (e.g., Ekonol).

Since a majority of the lower bushing 36 extends outside the bore 14 as the piston 16 reciprocates past the edge 60, the relatively harder material of the lower bushing 36 helps the lower bushing 36 maintain its shape and not become damaged by the edge 60, which may be sharp. For example, if the lower bushing 36 becomes torn, loses its shape, and/or becomes damaged, the edge 60 may catch the lower bushing 36 and potentially prevent the piston 16 from reciprocating. The material chosen for the lower bushing 36 has relatively higher creep resistance, which helps the lower bushing 36 maintain its shape, and a relatively high tensile strength, which helps the lower bushing 36 resist tearing.

Since the upper bushing 40 is fully contained in the bore 14 as the piston 16 reciprocates, the relatively softer material is acceptable for avoiding abrasions on the wall 24 of the bore 14. The softer upper bushing 40 also makes it relatively easy to shape for facilitating installation.

With reference again to FIG. 3, an upper portion 62 of the bore wall 24 shows less abrasion (from the relatively softer upper bushing 40) than the second portion 56 of the bore wall 24, which shows more abrasion from the relatively harder lower bushing 36.

In one embodiment, the wall 24 of the bore 14 (e.g., the housing 12) is aluminum, and the piston 16 is a relatively harder material (e.g., steel). In this embodiment, contact between the piston 16 and the wall 24 is minimized and/or prevented to avoid potential damage to the wall 24 caused by the relatively harder piston 16. The steel piston 16 seals against a steel plate (not shown) below the aluminum bore 14. If the steel piston 16 were made entirely of a softer material, such as PEEK, the seal against the steel plate would not be adequate. Therefore, the contemplated piston assembly 10 with guide bushings 36, 40 helps to protect the relatively softer aluminum bore wall 24 while providing any advantages gained by use of a steel piston 16.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A piston and cylinder assembly, the assembly comprising:

a housing defining a bore;

a piston sized to reciprocate in the bore;

a first sealing member providing a sealing engagement between the piston and a wall of the bore;

a first bushing, of a first material, around a first portion of the piston toward a first end of the piston; and a second bushing, of a second material, around a second portion of the piston toward a second end of the piston, the first and second bushings guiding the piston within the bore, and the first material being different than the second material.

2. The piston and cylinder assembly as set forth in claim 1, wherein:

the housing is an aluminum material; and the piston is a steel material.

3. The piston and cylinder assembly as set forth in claim 1, wherein:

the first material is relatively harder than the second material.

4. The piston and cylinder assembly as set forth in claim 3, wherein:

the first material has a hardness of about 85±5 Shore D, an elongation of about 25%, a tensile strength of about 13778 psi (95 MPa), and a coefficient of friction of about 0.30 to about 0.38; and the second material is an internally lubricated plastic having a hardness of about 60±5 Shore D and a coefficient of friction of about 0.18.

5. The piston and cylinder assembly as set forth in claim 3, wherein:

the first material is substantially PEEK; and the second material is substantially PTFE.

6. The piston and cylinder assembly as set forth in claim 3, wherein:

a first edge is defined along the wall of the bore; and the first bushing reciprocates at the first edge so that a majority of the first bushing passes by the first edge during the reciprocation.

7. The piston and cylinder assembly as set forth in claim 1, wherein:

an outside diameter of the first sealing member is greater than or equal to outside diameters of both the first portion of the piston and the first bushing.

8. The piston and cylinder assembly as set forth in claim 7, further including:

a second sealing member providing a sealing engagement between the piston and the wall of the bore;

wherein an outside diameter of the second sealing member is greater than or equal to outside diameters of both the second portion of the piston and the second bushing.

9. The piston and cylinder assembly as set forth in claim 1, wherein:

the first and second bushings include respective splits for facilitating installation around the respective first and second portions of the piston.

10. The piston and cylinder assembly as set forth in claim 1, wherein:

as the piston reciprocates in the bore, the first sealing member rides along a first portion of the wall;

as the piston reciprocates in the bore, the first bushing rides along a second portion of the wall; and the first portion of the wall at least partially overlaps the second portion of the wall.

11. A piston and cylinder assembly, the assembly comprising:

a housing defining a bore;

a piston sized to reciprocate in the bore;

a first bushing, of a first material, around a first portion of the piston toward a first end of the piston;

a first sealing member, proximate the first bushing, providing a seal between the piston and a wall of the bore; and a second bushing, of a second material, around a second portion of the piston toward a second end of the piston, the first and second bushings guiding the piston within the bore, and the first material being different than the second material.

12. The piston and cylinder assembly as set forth in claim 11, wherein:

the guiding of the piston provided by the first bushing reduces side loads on the first sealing member generated during reciprocation of the piston in the bore.

13. The piston and cylinder assembly as set forth in claim 12, wherein:

the reduced side loads on the first sealing member reduce wear on the first sealing member.

14. The piston and cylinder assembly as set forth in claim 11, further including:

a second sealing member, proximate the second bushing, providing a seal between the piston and the wall of the bore, the guiding of the piston provided by the second bushing reducing side loads on the second sealing member generated during reciprocation of the piston in the bore.

15. The piston and cylinder assembly as set forth in claim 11, wherein:

the first material is relatively harder and has a higher tensile strength than the second material.

16. A piston and cylinder assembly, including:

a piston sized to reciprocate in the bore;

a first sealing member providing a seal between the piston and a wall of the bore;

means for reducing side loads on the first sealing member generated during reciprocation of the piston in the bore.

17. The piston and cylinder assembly as set forth in claim 16, wherein the means for reducing side loads on the first sealing member includes:

a first bushing, of a first material, around a first portion of the piston toward a first end of the piston; and a second bushing, of a second material, around a second portion of the piston toward a second end of the piston, the first material being different than the second material.

18. The piston and cylinder assembly as set forth in claim 17, wherein:

the first material is relatively harder, has a higher tensile strength, and has a higher coefficient of friction than the second material.

19. The piston and cylinder assembly as set forth in claim 17, further including:

a second sealing member, proximate the second bushing, providing a seal between the piston and the wall of the bore;

wherein the first sealing member is proximate the first bushing.

20. The piston and cylinder assembly as set forth in claim 19, wherein:

the first and second bushings slidably engage the wall of the bore to guide the piston within the bore to reduce the side loads on the first and second sealing member, respectively, generated during reciprocation of the piston in the bore.

* * * * *